United States Patent [19]

Kennedy, III et al.

[11] Patent Number: 5,579,376

[45] Date of Patent: Nov. 26, 1996

[54] PHANTOM MOBILE-IDENTIFICATION NUMBER METHOD AND APPARATUS

[75] Inventors: William C. Kennedy, III, Dallas; Robert J. Charles, Plano, both of Tex.

[73] Assignee: Highwaymaster Communications, Inc., Dallas, Tex.

[21] Appl. No.: 434,127

[22] Filed: May 3, 1995

Related U.S. Application Data

[63] Continuation of Ser. No. 178,411, Jan. 6, 1994, abandoned, which is a continuation of Ser. No. 150,238, Nov. 9, 1993, Pat. No. 5,454,027, which is a continuation of Ser. No. 826,521, Jan. 27, 1992, abandoned.

[51] Int. Cl.$^6$ ..................................................... H04Q 7/32
[52] U.S. Cl. ........................... 379/60; 379/59; 455/33.1; 455/3.2
[58] Field of Search .................................. 379/58, 59, 60, 379/63; 455/33.1, 33.2

[56] References Cited

U.S. PATENT DOCUMENTS

| Re. 34,034 | 8/1992 | O'Sullivan | 379/59 |
|---|---|---|---|
| 3,518,674 | 6/1970 | Moorehead et al. | 343/112 |
| 3,680,121 | 7/1972 | Anderson et al. | 343/112 TC |
| 3,714,650 | 1/1973 | Fuller et al. | 343/6.5 LC |
| 3,757,290 | 9/1973 | Ross et al. | 340/23 |
| 3,789,409 | 1/1974 | Easton | 343/112 R |
| 3,848,254 | 11/1974 | Drebinger et al. | 343/112 R |
| 3,906,166 | 9/1975 | Cooper et al. | 179/41 A |

(List continued on next page.)

FOREIGN PATENT DOCUMENTS

| 3767589 | 2/1993 | Australia | G01S 5/02 |
|---|---|---|---|
| 0242099 | 10/1987 | European Pat. Off. | G01S 5/14 |
| 0290725 | 11/1988 | European Pat. Off. | H04Q 7/04 |
| 0367935 | 5/1990 | European Pat. Off. | H04Q 7/04 |
| 3516357 | 11/1986 | Germany | H04B 7/26 |
| 3932029 | 6/1990 | Germany | G01S 1/00 |
| 0161941 | 9/1984 | Japan | H04B 7/26 |
| 0175537 | 7/1988 | Japan | H04B 7/26 |
| 0219238 | 9/1988 | Japan | H04B 7/26 |
| 0226226 | 9/1989 | Japan | H04B 7/26 |
| 2193861 | 2/1988 | United Kingdom | H04Q 7/04 |
| 2221113 | 1/1993 | United Kingdom | . |
| WO8904035 | 5/1989 | WIPO | G10L 5/06 |
| WO8912835 | 12/1989 | WIPO | G01S 5/02 |

OTHER PUBLICATIONS

"Trimpack Technical Specifications," *TrimbleNavigation*, May, 1989.

James C. Reynolds, et al., "GPS–Based Vessel Position Monitoring and Display System," *IEEE Plans '90 Position Location and Navigation Symposium*, Aug. 1990, pp. 601–607.

R. DeSadaba, "Personal Communications in the Intelligent Network," *British Telecommunications Engineering*, vol. 9, Aug., 1990, pp. 80–83.

(List continued on next page.)

*Primary Examiner*—Curtis Kuntz
*Assistant Examiner*—G. J. Oehling
*Attorney, Agent, or Firm*—Baker & Botts, L.L.P.

[57] ABSTRACT

A method and apparatus for changing the mobile identification number of a cellular telephone unit to reflect a local network planning area number, including a cellular telephone unit having a microprocessor and associated data storage. The microprocessor is programmed to interrogate the cellular telephone unit to obtain the local system identification number. The network planning area number corresponding to the system identification number is included as a part of the mobile identification number, thereby establishing a local cellular system number, such that the cellular telephone unit appears as a local unit to enable calls to be pre-validated by the local cellular system. Both the cellular telephone unit and the cellular system determine the local cellular system number independently. In response to an incoming call for the cellular telephone unit, the local cellular system pages the cellular telephone unit using the local cellular system number.

21 Claims, 4 Drawing Sheets

U.S. PATENT DOCUMENTS

| | | | |
|---|---|---|---|
| 4,053,893 | 10/1977 | Boyer | 343/112 PT |
| 4,083,003 | 4/1978 | Haemming | 325/6 |
| 4,107,689 | 8/1978 | Jellinek | 343/23 |
| 4,152,693 | 5/1979 | Ashworth, Jr. | 340/24 |
| 4,177,466 | 12/1979 | Reagan | 343/112 TC |
| 4,222,052 | 9/1980 | Dunn | 343/112 R |
| 4,428,052 | 1/1984 | Robinson et al. | 364/436 |
| 4,428,057 | 1/1984 | Setliff et al. | 364/521 |
| 4,435,711 | 3/1984 | Ho et al. | 343/389 |
| 4,445,118 | 4/1984 | Taylor et al. | 343/357 |
| 4,547,778 | 10/1985 | Hinkle et al. | 343/456 |
| 4,590,569 | 5/1986 | Rogoff et al. | 364/452 |
| 4,644,351 | 2/1987 | Zabarsky et al. | 340/825.44 |
| 4,651,157 | 3/1987 | Gray et al. | 342/457 |
| 4,654,879 | 3/1987 | Goldman et al. | 455/33 |
| 4,660,037 | 4/1987 | Nakamura | 340/990 |
| 4,670,905 | 6/1987 | Sandvos et al. | 455/33 |
| 4,688,244 | 8/1987 | Hannon et al. | 379/58 |
| 4,700,374 | 10/1987 | Bini | 379/60 |
| 4,734,928 | 3/1988 | Weiner et al. | 379/59 |
| 4,737,978 | 4/1988 | Burke et al. | 379/60 |
| 4,740,792 | 4/1988 | Sagey et al. | 342/457 |
| 4,742,357 | 5/1988 | Rackley | 342/457 |
| 4,750,197 | 6/1988 | Denekamp et al. | 379/58 |
| 4,754,465 | 6/1988 | Trimble | 375/1 |
| 4,774,670 | 9/1988 | Palmieri | 364/446 |
| 4,775,999 | 10/1988 | Williams | 379/59 |
| 4,776,003 | 10/1988 | Harris | 379/91 |
| 4,788,637 | 11/1988 | Tamaru | 364/200 |
| 4,791,571 | 12/1988 | Takahashi et al. | 364/436 |
| 4,791,572 | 12/1988 | Green, III et al. | 364/449 |
| 4,796,189 | 1/1989 | Nakayama et al. | 364/449 |
| 4,797,948 | 1/1989 | Milliorn et al. | 455/54 |
| 4,799,162 | 1/1989 | Shinkawa et al. | 364/436 |
| 4,804,937 | 2/1989 | Barbiaux et al. | 340/52 F |
| 4,809,005 | 2/1989 | Counselman, III | 342/352 |
| 4,819,174 | 4/1989 | Furuno et al. | 364/444 |
| 4,833,477 | 5/1989 | Tendler | 342/389 |
| 4,833,701 | 5/1989 | Comroe et al. | 379/60 |
| 4,833,702 | 5/1989 | Shitara et al. | 379/60 |
| 4,843,575 | 6/1989 | Crane | 364/550 |
| 4,860,341 | 8/1989 | D'Avello et al. | 379/91 |
| 4,866,762 | 9/1989 | Pintar | 379/200 |
| 4,876,738 | 10/1989 | Selby | 455/33 |
| 4,884,208 | 11/1989 | Marinelli et al. | 364/460 |
| 4,891,650 | 1/1990 | Sheffer | 342/457 |
| 4,891,761 | 1/1990 | Gray et al. | 364/452 |
| 4,897,642 | 1/1990 | DiLullo et al. | 340/825.06 |
| 4,901,340 | 2/1990 | Parker et al. | 379/60 |
| 4,905,270 | 2/1990 | Ono | 379/58 |
| 4,907,290 | 3/1990 | Crompton | 455/56 |
| 4,908,629 | 3/1990 | Apsell et al. | 342/457 |
| 4,912,756 | 3/1990 | Hop | 379/60 |
| 4,914,686 | 4/1990 | Hagar, III et al. | 379/61 |
| 4,945,570 | 7/1990 | Gerson et al. | 381/110 |
| 4,953,198 | 8/1990 | Daly et al. | 379/61 |
| 4,963,865 | 10/1990 | Ichikawa et al. | 340/995 |
| 4,993,062 | 2/1991 | Dula et al. | 379/88 |
| 4,998,291 | 3/1991 | Marui et al. | 455/89 |
| 5,003,317 | 3/1991 | Gray et al. | 342/457 |
| 5,008,814 | 4/1991 | Mathur | 364/200 |
| 5,014,206 | 5/1991 | Scribner et al. | 364/449 |
| 5,019,963 | 5/1991 | Alderson et al. | 364/200 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,045,861 | 9/1991 | Duffett-Smith | 342/457 |
| 5,046,082 | 9/1991 | Zicker et al. | 379/59 |
| 5,055,851 | 10/1991 | Sheffer | 342/457 |
| 5,058,201 | 10/1991 | Ishii et al. | 455/33 |
| 5,068,656 | 11/1991 | Sutherland | 340/989 |
| 5,090,050 | 2/1992 | Heffernan | 379/60 |
| 5,101,500 | 3/1992 | Marui | 379/60 X |
| 5,119,102 | 6/1992 | Barnard | 342/357 |
| 5,121,126 | 6/1992 | Clagett | 342/419 |
| 5,121,325 | 6/1992 | DeJonge | 364/442 |
| 5,131,019 | 7/1992 | Sheffer et al. | 379/39 |
| 5,131,020 | 7/1992 | Liebesny et al. | 379/59 |
| 5,142,281 | 8/1992 | Park | 340/991 |
| 5,142,654 | 8/1992 | Sonberg et al. | 379/59 |
| 5,153,904 | 10/1992 | Coombes et al. | 379/58 |
| 5,155,490 | 10/1992 | Spradley, Jr. et al. | 342/357 |
| 5,155,847 | 10/1992 | Kirouac et al. | 395/600 |
| 5,159,625 | 10/1992 | Zicker | 379/59 |
| 5,166,694 | 11/1992 | Russell et al. | 342/457 |
| 5,172,321 | 12/1992 | Ghaem et al. | 364/444 |
| 5,208,756 | 5/1993 | Song | 364/449 |
| 5,223,844 | 6/1993 | Mansell et al. | 342/357 |
| 5,225,842 | 7/1993 | Brown et al. | 342/357 |
| 5,235,633 | 8/1993 | Dennison et al. | 379/60 |
| 5,237,612 | 8/1993 | Raith | 455/33.1 X |
| 5,243,529 | 9/1993 | Kashiwazaki | 364/449 |
| 5,247,564 | 9/1993 | Zicker | 379/40 |
| 5,252,982 | 10/1993 | Frei | 342/357 |
| 5,261,118 | 11/1993 | Vanderspool, II et al. | 455/51.2 |
| 5,270,936 | 12/1993 | Fukushima et al. | 364/444 |
| 5,276,729 | 1/1994 | Higuchi et al. | 379/58 |
| 5,293,163 | 3/1994 | Kakihara et al. | 340/995 |
| 5,297,191 | 3/1994 | Gerszberg | 379/59 |
| 5,297,192 | 3/1994 | Gerszberg | 379/59 |
| 5,299,132 | 3/1994 | Wortham | 364/460 |
| 5,311,194 | 5/1994 | Brown | 342/357 |
| 5,323,322 | 6/1994 | Mueller et al. | 364/449 |
| 5,365,516 | 11/1994 | Jandrell | 370/18 |
| 5,392,458 | 2/1995 | Sasuta et al. | 455/54.1 |
| 5,396,540 | 3/1995 | Gooch | 379/59 |

OTHER PUBLICATIONS

Gary D. Ott, "Vehicle Location in Cellular Mobile Radio Systems," *IEEE,* vol. VT–26, No. 1, Feb., 1977, pp. 43–46.

"GPS Navstar Global Positioning System User's Overview—YEE–82–009D," *Navstar Global Positioning System Joint Program Office,* Mar., 1991, pp. 1–164.

"U.S. Coast Guard Differential GPS" Brochure, *U.S. Department of Transportation, United States Coast Guard,* May, 1993.

"GPS Facts & Figures" Brochure, *U.S. Department of Transportation, United States Coast Guard,* May, 1993.

D. H. Alsip, J. M. Butler, and J. T. Radice, "Implementation of the U.S. Coast Guard's Differential GPS Navigation Service," *U.S. Coast Guard Headquarters, Office of Navigation Safety and Waterway Services, Radionavigation Division,* Jun. 28, 1993, pp. 1–10.

"Motorola GPS Technical Reference Manual," *Motorola,* Oct. 1993, Manual Cover, Title Page, and p. 4–109.

Don Burtis, "CDPD—A Bandwidth Optimization Technique for Cellular Telephones," *Computer Design's OEM Integration,* May, 1994, pp. 19–20.

"U.S. Coast Guard Bulletin Board System File 'FRP–DGPS'", *U.S. Coast Guard,* Date Unknown, pp. 1–6.

Gene L. Schlechte, LCDR, "U.S. Coast Guard Bulletin Board System Document 'Design.Txt'—Design Process for the United States Coast Guard's Differential GPS Navigation Service," *U.S. Coast Guard, U.S. Coast Guard Omega Navigation System Center,* Date Unknown, pp. 1–21.

"Appendix B, The 1991 Radionavigation User Conference," *Department of Transportation,* Date Unknown, pp. 1–2.

Kirk Ladendorf, "First in Flight—Using State–Of–The–Art Technology, Austin–Based Arrowsmith Technologies Establishes Itself As A Major Player in Nascent Technology–Supplier Market," *Austin America–Statesman,* Jan. 30, 1995, 3 pages.

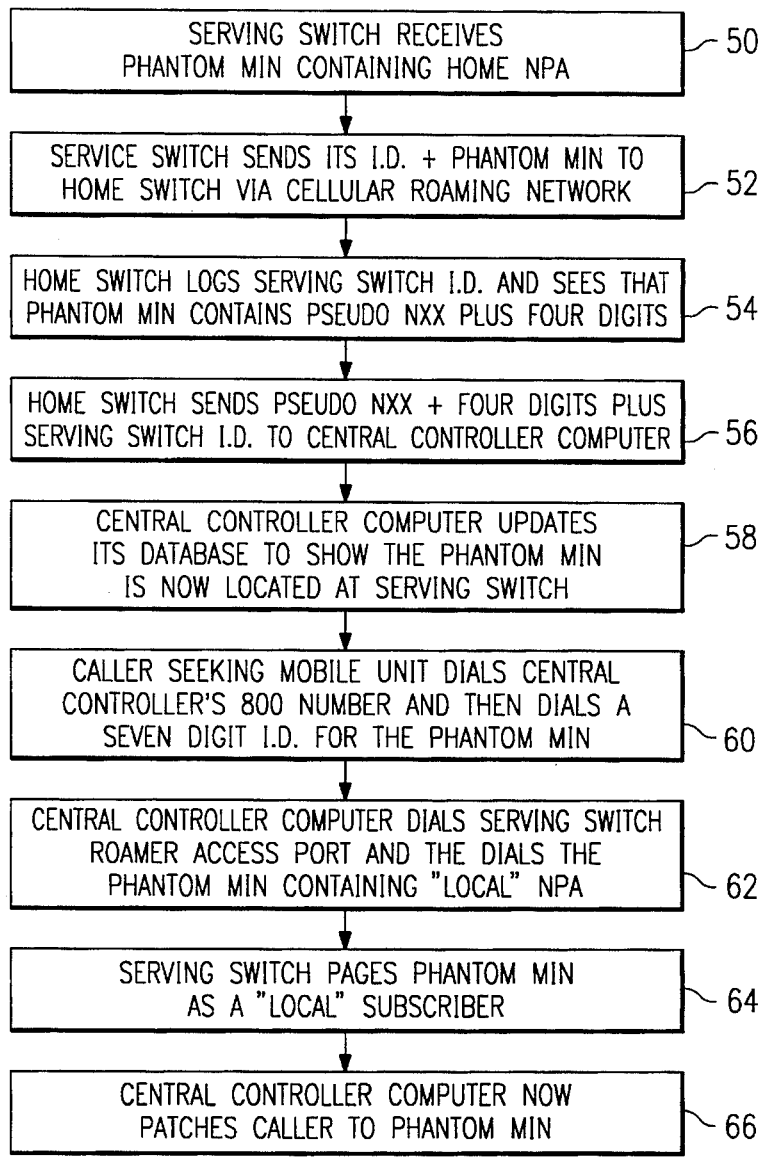
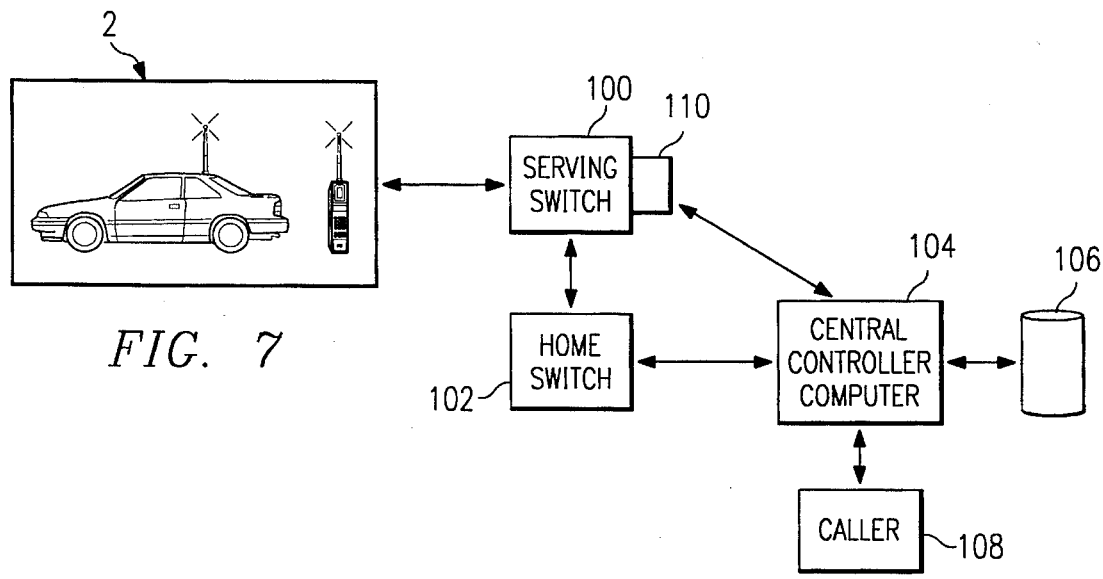

PHANTOM MOBILE-IDENTIFICATION NUMBER METHOD AND APPARATUS

This application is a continuation of application Ser. No. 08/178,411 filed Jan. 6, 1994, entitled "Phantom Mobile Identification Number Method and Apparatus," by William C. Kennedy III and Robert J. Charles, now abandoned; which is a continuation of application Ser. No. 08/150,238, filed Nov. 9, 1993 by William C. Kennedy III and Robert J. Charles and entitled "Phantom Mobile Identification Number and Apparatus," now U.S. Pat. 5,454,027; which is a continuation of application Ser. No. 07/826,521, filed Jan. 27, 1992, by William C. Kennedy III and Robert J. Charles entitled "Phantom Mobile Identification Number Method and Apparatus," now abandoned.

TECHNICAL FIELD

This invention relates to cellular telephones utilized in cellular telephone systems, and more specifically to a method and apparatus for changing the mobile identification number of a cellular telephone to represent a local telephone number.

BACKGROUND OF THE INVENTION

Over the past several years the use of cellular telephones has greatly increased in this country. As the number of users has increased, so has the number of cellular telephone systems around the country. This expansion of both users and systems has created the situation where a user of a cellular telephone from one system enters another system and uses the cellular telephone. An individual who uses a cellular telephone in this manner is known as a roamer.

With the increased use of cellular telephones and the consequential increase of roamers, a problem has arisen known as "roamer fraud". This type of fraud occurs when a roamer makes a long-distance telephone call from another cellular network system for which he has no intention of paying. At the present time under these circumstances, the cellular system from which the call is made cannot check to see if the caller has a valid account until after the call since the caller's account is with another system. With local system callers, the account may be validated before the call is made since the local caller has account information already on file with the cellular network system. Roamer fraud is estimated to be costing cellular network systems throughout the country millions of dollars a year.

Some cellular network systems have begun to attack the problem of roamer fraud by limiting roamer customers to certain types of calls within their systems. Another procedure that has been adopted to recover some of the roamer fraud losses is to charge higher rates for calls made by roamers. Both of these procedures are inconvenient to the customer and do not completely address the problem of roamer fraud.

Thus, a need has arisen for a system which will be more convenient for new roamer callers while at the same time protecting cellular network systems from the losses incurred by roamer fraud.

SUMMARY OF THE INVENTION

The method and apparatus of the present invention overcomes the foregoing and other problems associated with the prior art by using a variable mobile identification number (MIN). The MIN consists of three separate parts: a three-digit network planning area number (NPA) which is similar to an area code number, a three-digit pseudo NXX number, and four-digit mobile number. The NXX number and the mobile number are constant. The NPA is a variable number which is set according to the area code of the cellular network system in which the user is presently located. When a roamer cellular telephone first enters a new system, the telephone determines the identity of the new system by reading a broadcast signal emitted from the system. The cellular telephone then sets the NPA number of its mobile identification number for the area in which the caller is presently located. This allows the roamer cellular telephone to appear as a local customer of the network system where the caller is presently located. The user's account may be immediately checked to determine if the account is good on the system's local data base. This check requires that the MIN of the roamer cellular telephone be pre-approved by the cellular network system before the number is used in the area.

The advantages of this invention to cellular network systems include reducing the risk from roamer fraud. Roamer fraud will be reduced since all calls made from telephones with variable MIN's may be pre-validated. The cost of the system to cellular network systems is limited since no modification of existing equipment or billing methods will be required because the apparatus for programming the MIN number is located in the cellular telephone unit. Furthermore, the present customers of the system will not be affected by roamer traffic which makes use of the invention. The main advantage to the new roamer customer is that there will be a constant class of service throughout the country at a reduced customer rate.

BRIEF DESCRIPTION OF THE DRAWINGS

For a more complete understanding of the present invention and the advantages thereof, reference is now made to the following detailed descriptions taken in conjunction with the accompanying drawings in which:

FIG. 5 is a block diagram of the process for connecting a call to a phantom MIN number using national roaming cellular networks; FIG. 7 is a block diagram of the hardware for connecting a call to a cellular telephone unit.

DETAILED DESCRIPTION OF THE INVENTION

Figure 1:
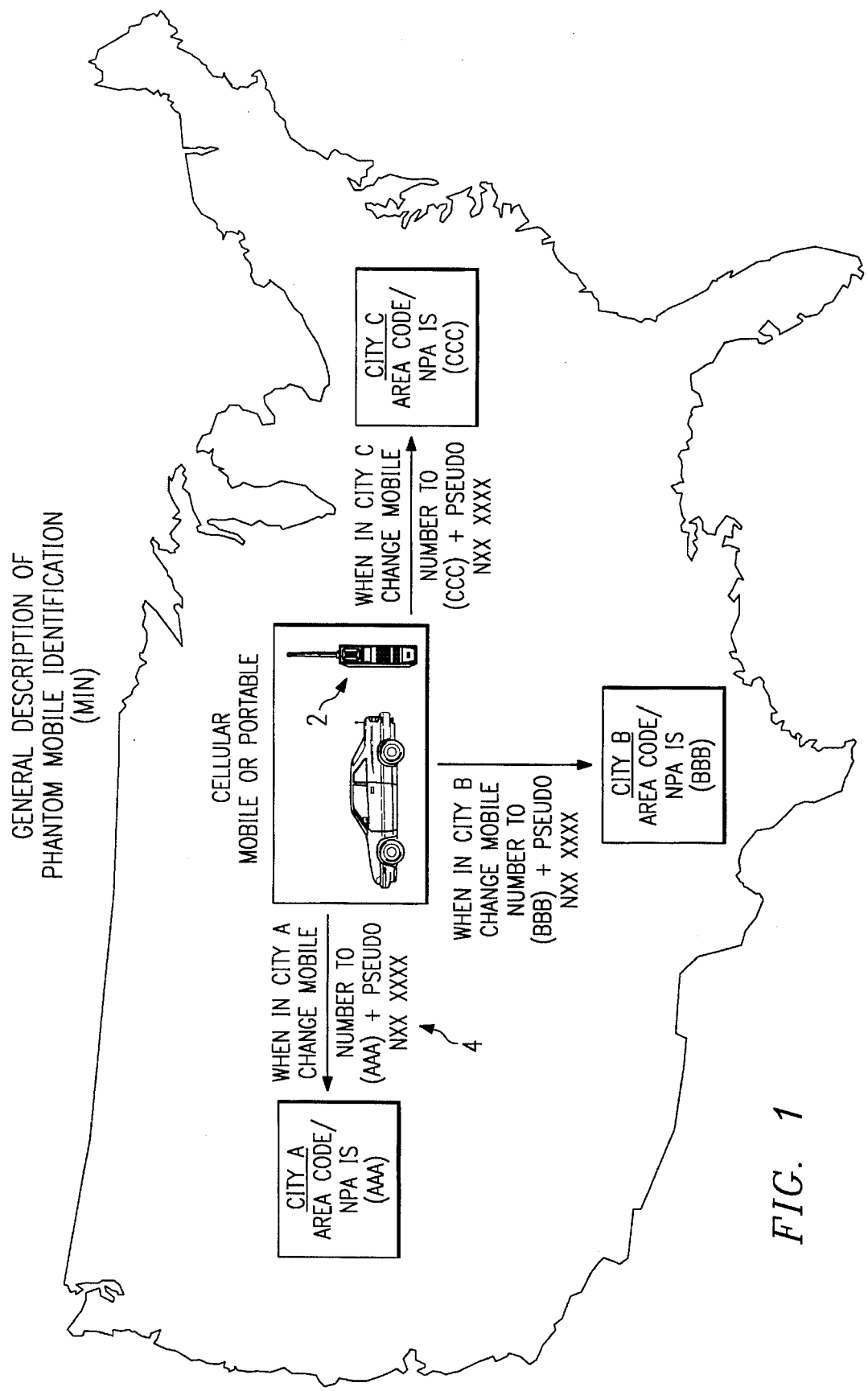
FIG. 1 illustrates how the NPA/area code number is changed when traveling to service areas in different cities.

Referring now to the drawings, and more particularly to FIG. 1 wherein there is shown an overall illustration of how the phantom MIN system works. When the cellular telephone unit 2 enters a city A, the NPA of the phantom MIN number will change to the local NPA number 4 designated as "AAA." Similarly changes of the NPA number occur if the cellular telephone unit 2 enters city B or city C.

Figure 2:
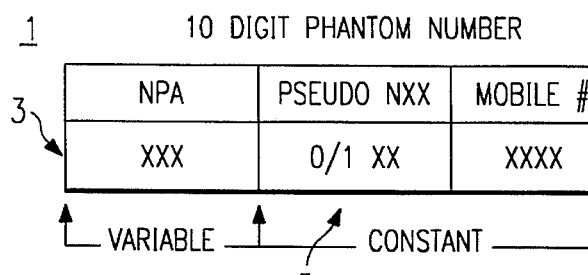
FIG. 2 is a diagram of the ten-digit phantom MIN number and its corresponding subparts.

As illustrated in FIG. 2, a ten-digit phantom MIN number 1 is configured such that the first three digits represent the NPA number 3 which is a variable number depending on the area where the unit is located. The second three digits represent the non-changing pseudo NXX number 5. Under this system, the NXX number would begin with either a one or a zero. NXX numbers using the one or zero prefix are not currently in public use in this country. Therefore calls originating from the public switched telephone network (PSTN) and terminating on numbers which have a one or a zero as the first digit of the NXX are not permitted. However, the cellular telephone network switches will allow the origination and the termination of calls to and from phantom MIN numbers.

For calls terminating on the phantom MIN, the originating caller from the PSTN has to dial the roamer access telephone number of the cellular switch and then dial the phantom MIN number. By using this method a terminating call to the phantom MIN can be connected. The last four digits are a mobile number 7 which are also non-changing. These last seven digits, the NXX number 5 and mobile number 7, will be non-changing and each cellular telephone unit 2 operating under the system will be assigned its own personalized set NXX number 5 and mobile number 7.

Figure 3:
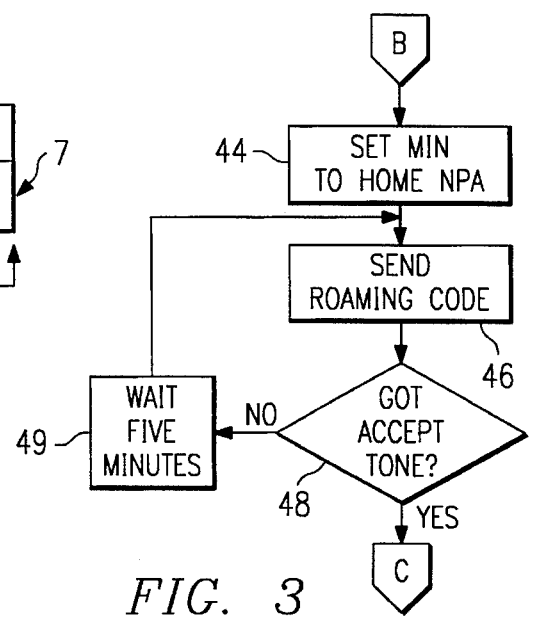
FIGS. 3 and 4 are flow charts of the process for changing the phantom MIN number, to set up call connections from the mobile cellular unit and to reflect the local NPA/area code number.
Figure 6:
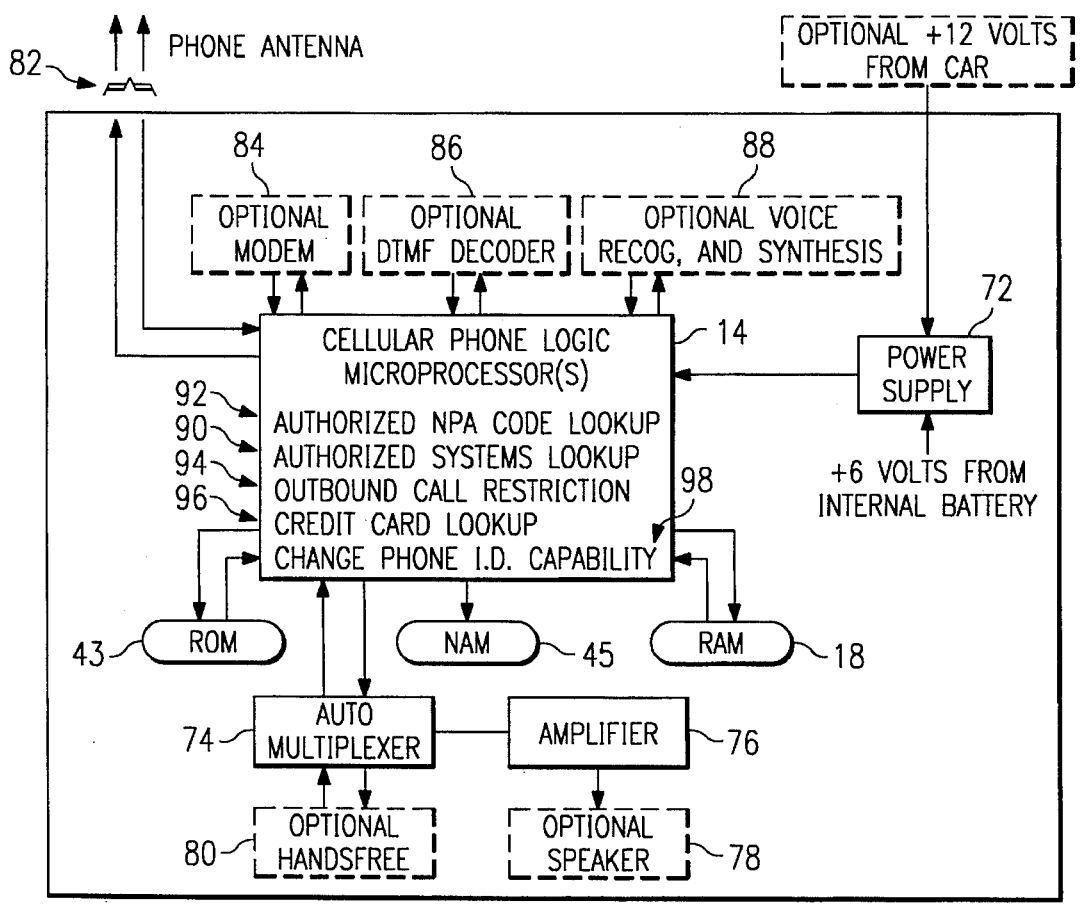
FIG. 6 is a block diagram of the hardware included in a cellular telephone to implement the phantom MIN system.
Figure 4:
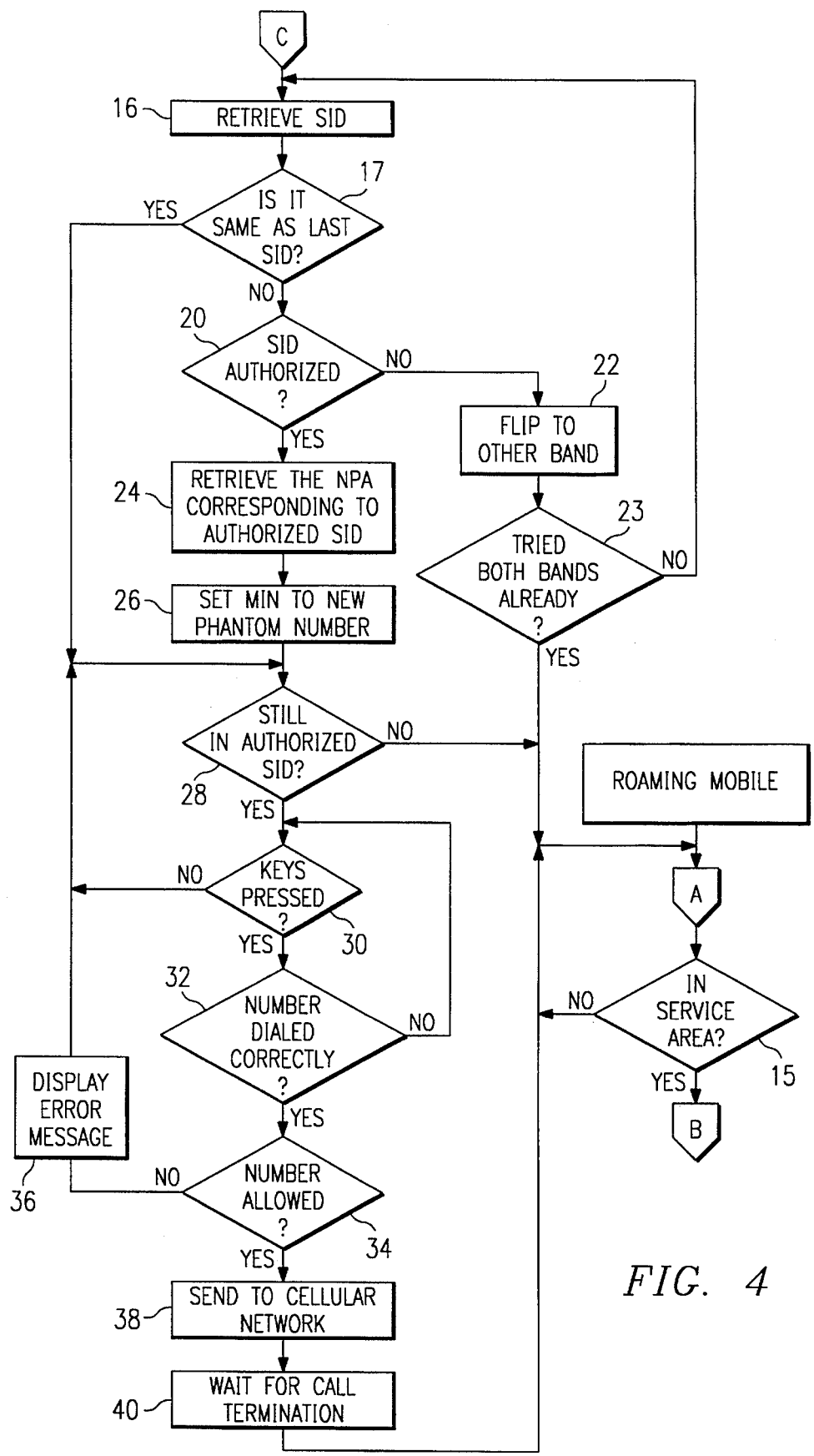

The changes in the phantom MIN number will thus be limited to the NPA. The manner of this change is illustrated in FIGS. 3, 4 and 6. When the cellular telephone unit 2 is turned on, a microprocessor 14 interrogates the cellular telephone unit 2 during an inquiry step 15 to determine if the unit is in a cellular network system.

A cellular telephone unit 2 under the phantom MIN system may be connected to incoming calls by utilizing present cellular roaming technology with some slight variations. To prepare the cellular telephone unit 2 to send or receive calls, the microprocessor 14 in the cellular telephone unit 2 is notified any time the unit enters a new service area as a result of the inquiry 15. FIG. 3, the microprocessor 14 then runs instruction 44 to set the NPA of the phantom MIN to the cellular telephone unit's home NPA and then runs the instruction set 46 to send the roaming code which may be either "18" or "31" to the local serving switch. Once the microprocessor 14 receives confirmation that the local switch has received the roaming code as a result of running the inquiry 48, the MIN number of the cellular telephone unit 2 will be changed to reflect a local MIN number as discussed in conjunction with FIG. 1. If no confirmation is received at inquiry step 48, the microprocessor waits five minutes at step 49 and then again runs instruction set 46.

If the cellular telephone unit 2 is located within a cellular network system, the unit will self program to receive incoming calls, and the microprocessor 14 will retrieve from the cellular telephone unit 2 the local system identification number (SID) during a retrieve step 16. The SID is first compared with the most recently used SID during an interrogation step 17. To carry out this operation the local SID is compared with a data base located in the random access memory (RAM) 18 of authorized SID numbers during an interrogation step 20. If the SID number is not authorized, the microprocessor 14 instructs the cellular telephone unit to change to its other band as shown by the flip band step 22. The inquiry 23 is then completed with the process either returning to the inquiry 15 or recycling to the retrieve step 16.

Once an authorized SID number is identified, the microprocessor 14 searches a data base in its random access memory 18 for the NPA corresponding to the authorized SID number. This operation is completed when running the retrieve instructions 24. The microprocessor 14 then changes the phantom MIN number to reflect the local NPA during the running of instructions 26. With the phantom MIN number set to a local number, calls from the cellular telephone unit 2 may now be pre-call validated by the local cellular network system. This will, of course, require that the phantom MIN number to be used in the local network system be pre-approved from the user's home cellular network system.

After the new phantom MIN number is set when running the instructions 26, the microprocessor 14 again determines if the cellular telephone unit 2 is in an authorized SID area when running the inquiry step 28. If not, the procedure for retrieval of an authorized SID will return to the service step 15. If the cellular telephone unit 2 is still in an authorized SID, the microprocessor 14 determines if the keys of the mobile cellular telephone unit 2 are being pressed during the running of an inquiry step 30 and if a number has been correctly dialed during the inquiry step 32. Once a correctly dialed number is received by the microprocessor 14, it will scan an allowed number data base stored in RAM 18 to determine if the call is being made to an authorized number. The operation is completed during the running of an inquiry 34.

Under this system, the allowed number data base will be limited to three types of calls. The types of calls include local calls, 1+800 calls and 0+operator credit card calls. A 1+ long distance call will not be allowed by the cellular telephone unit 2 as this is the major area where roamer fraud occurs. If the number is an unauthorized 1+ call, the process at inquiry 34 will not forward the call to the cellular network and an error message Will be displayed during the running of display instructions 36. If the number is authorized, the call is forwarded to the cellular network system during the running of a send set of instructions 38 and registers with the system as a local call due to its local NPA number. The microprocessor 14 monitors the call until it terminates as identified by the call termination step 40.

Referring to FIG. 5, there is illustrated the procedure for connecting a call to a cellular telephone unit. The process begins when the serving switch of the local cellular network system receives a phantom MIN containing the home NPA number when the serving system runs the set of instructions 50. The serving switch then sends its identification number and the phantom MIN it received to the home switch by means of the cellular roaming network during the step 52. The home switch logs the serving switch's identification number and identifies that the phantom MIN contains a pseudo NXX number plus four digits when the instruction set 54 is run. This will flag the switch to send the NXX number, the four digit mobile number, and the serving switch's identification number to the computer of central controller during the running of the instruction set 56. The central controller computer 10 then updates the cellular telephone unit's location database to the position indicated by the serving switch's identification number during process step 58.

A caller seeking to call a cellular telephone unit containing a phantom MIN number dials the 800 number of the central controller computer and then enters a seven digit identification number for the particular cellular telephone unit he was attempting to call. This process is completed when running the instruction set 60. The computer of the central controller then dials the serving switch roamer access port in which the cellular telephone unit presently resides during the running of instructions 62. Once connected, the computer dials the phantom MIN number containing the local NPA number for the cellular telephone unit also during the process instructions 62. The local serving switch pages the cellular telephone unit by means of the phantom MIN number as a local subscriber when running the instruction set 64. When the telephone unit responds to the page, the caller is passed through to the cellular telephone unit containing the correct phantom MIN during the process step 66.

Returning to the block diagram of FIG. 6, the in-phone portion of the system comprises the microprocessor 14 having an associated read-only memory "ROM" 43, the random access memory "RAM" 18, and a number assignment module "NAM" 45, which is the unit storing the home NPA number. In this system, the RAM 18 stores the local NPA.

The ROM 43 contains the necessary control programs for operation of the in-phone portion of the system. The RAM 18 contains several data base lists of SID numbers, NPA numbers, authorized system numbers and authorized telephone numbers.

A power supply 72, either internal or connected to the vehicle battery, provides power for the microprocessor 14. Also, an audio multiplexer 74 connects to the micro-processor 14 to pass voice signals through to an amplifier 76 for broadcast over a speaker 78. An optional hands-free microphone 80 may also be connected to the audio multiplexer 74.

A phone antenna 82 allows for the transmission and reception of signals over the cellular network system. There are also several optional items which may be connected to the microprocessor 14 in alternative embodiments of the invention. A modem 84 may be connected to the microprocessor 14 to allow for data transmission between the cellular telephone unit 2 and a remote location (not shown). A DTMF decoder 86 is an option to be added to allow for detection of tones sent from a touch tone telephone. Finally, a voice recognition and synthesis module 88 is another option to allow for voice activation and termination of telephone calls on the cellular telephone unit 2 and thus make the unit completely hands free.

To limit the use of the phantom MIN system to areas which have pre-approved the MIN number system, the microprocessor 14 has an authorized systems look-up function 90. This function 90 is run by the microprocessor 14 before the process of FIG. 4 to compare the present carrier SID number to a data base of authorized SID numbers stored in RAM 18 to determine if the present system subscribes to the phantom MIN system.

If the SID number is located in the data base, the microprocessor 14 has an authorized NPA look-up function 92. The function 92 compares the local SID number to a data base of NPA numbers located in RAM 18 in order to find the NPA number that corresponds to the local SID number.

To limit outgoing calls to the prescribed local, 1+800 and 0+ calls, the microprocessor 14 has an outbound call restriction function 94 (see the number allowed inquiry 34 of FIG. 4 to prevent the completion of any 1+ calls and to display an error message any time such a call is attempted. The microprocessor 14 also contains a credit card look-up function 96 which may be used to send a valid credit card number that is stored in RAM 18 when a credit card number is requested from the long distance carrier.

Finally, the microprocessor 14 includes a change phone ID capability function 98. This function operates to convert the phantom MIN number by changing the past NPA/area code number to the present NPA/area code number. Once this occurs, the cellular telephone unit 2 will register as a local number and not a roamer number. FIG. 7 is a block diagram of the hardware for connecting a call to cellular telephone unit 2. Cellular telephone unit 2 is coupled to serving switch 100 which is further coupled to home switch 102. Home switch 102 is coupled to central controller computer 104, which includes a database 106. A caller 108 seeking to connect to cellular telephone unit 2 dials central controller computer 104. Central controller computer 104 then dials roamer access port 110 of serving switch 100. Serving switch 100 pages cellular telephone unit 2 and central controller computer 104 patches caller 108 to cellular telephone unit 2.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention.

We claim:

1. A method of coupling a call to a cellular telephone unit located in an area serviced by a serving switch, the cellular telephone unit having a home mobile identification number including a network planning area number, the method comprising:

receiving at the cellular telephone unit a serving switch system identification number;

transmitting from the cellular telephone unit to a central controller computer, coupled to the serving switch, the home mobile identification number and the serving switch system identification number;

determining, at the central controller computer; a local cellular system number for the cellular telephone unit in response to the home mobile identification number and the serving switch system identification number received from the cellular telephone unit;

determining, at the cellular telephone unit, the local cellular system number for the cellular telephone unit in response to the home mobile identification number and the received serving switch system identification number; and modifying, at the cellular telephone unit, only the network planning area number of the home mobile identification number of the cellular telephone unit to identify the cellular telephone unit with the local cellular system number.

2. The method of claim 1, comprising:

receiving the call for the cellular telephone unit at the central controller computer; and coupling the call to the cellular telephone unit through the serving switch using the local cellular system number.

3. The method of claim 2, wherein the step of receiving the call for the cellular telephone unit comprises:

establishing communication with the central controller computer; and providing an access number identifying the cellular telephone unit.

4. The method of claim 2, wherein the step of coupling the call comprises:

accessing a roamer access port of the serving switch;

paging the cellular telephone unit using the local cellular system number; and patching a call to the cellular telephone unit through the serving switch.

5. The method of claim 1, wherein the step of transmitting comprises issuing a roamer code to the serving switch, the roamer code including a serving switch system identification number and the home mobile identification number of the cellular telephone unit, the roamer code indicating the presence of the cellular telephone unit as roamer in the serving switch.

6. The method of claim 1, wherein the step of receiving at the cellular telephone unit a serving switch system identification number further comprises:

interrogating a database to determine if the serving switch system identification number is authorized; and receiving at the cellular telephone unit a second serving switch system identification number corresponding to a second serving switch if the serving switch system identification number is not authorized.

7. The method of claim 1, wherein the home mobile identification number comprises:

a variable three-digit network planning area number; and a fixed seven-digit number following the three-digit network planning area number, the fixed seven-digit number identifying the cellular telephone unit.

8. The method of claim 1, comprising the step of updating the location of the cellular telephone unit at the central controller computer in response to the serving switch system identification number.

9. A national roaming cellular network, comprising:

a serving switch operable to emit a serving switch system identification number;

a cellular telephone unit coupled with the serving switch and located in an area serviced by the serving switch, the cellular telephone unit having a home mobile identification number that includes a network planning area number, the cellular telephone unit operable to receive the serving switch system identification number from the serving switch, the cellular telephone unit operable to transmit to the serving switch the home mobile identification number, the cellular telephone unit further operable to determine a local cellular system number for the cellular telephone unit in response to the home mobile identification number and the received serving switch system identification number, the cellular telephone unit further operable to modify only the network planning area number of the home mobile identification number of the cellular telephone unit to identify the cellular telephone unit with the local cellular system number; and a central controller computer coupled with the serving switch and operable to receive from the serving switch the home mobile identification number transmitted to the serving switch by the cellular telephone unit and the serving switch system identification number, the central controller computer further operable to determine the local cellular system number for the cellular telephone unit in response to the home mobile identification number and the serving switch system identification number.

10. The network of claim 9, further comprising a home switch coupled with the serving switch and the central controller computer, the home switch operable to receive the home mobile identification number and the serving switch system identification number from the serving switch and to communicate this information to the central controller computer.

11. The network of claim 9, wherein the central controller computer is operable to receive an incoming call placed to the cellular telephone unit, the central controller computer further operable to cause the incoming call to be routed to the cellular telephone unit using the local cellular system number.

12. The network of claim 9, wherein the cellular telephone unit is operable to issue a roamer code to the serving switch, the roamer code including the serving switch system identification number and the home mobile identification number of the cellular telephone unit, the roamer code indicating the presence of the cellular telephone unit as a roamer in the serving switch.

13. The network of claim 9, wherein the cellular telephone unit is further operable to determine if the serving switch system identification number is authorized and to receive a second serving switch system identification number corresponding to a second serving switch if the serving switch system identification number is not authorized.

14. The network of claim 9, wherein the central controller computer is operable to access a roamer access port of the serving switch and to cause the serving switch to page the cellular telephone unit using the local cellular system number.

15. The network of claim 9, wherein the home mobile identification number comprises:

a variable three-digit network planning area number;

a fixed seven-digit number following the three-digit network planning area number, the fixed seven-digit number identifying the cellular telephone unit.

16. A method of coupling a call to a cellular telephone unit located in an area serviced by a serving switch, the cellular telephone unit having a home mobile identification number that includes a network planning area number, the method comprising:

receiving at the cellular telephone unit a serving switch system identification number;

transmitting a roamer code from the cellular telephone unit to the serving switch, the roamer code including the serving switch system identification number and the home mobile identification number, the roamer code indicating the presence of the cellular telephone unit as a roamer in the serving switch;

receiving the roamer code at a central controller computer coupled to the serving switch;

determining, at the central controller computer, a local cellular system number for the cellular telephone unit in response to the roamer code;

determining, at the cellular telephone unit, the local cellular system number for the cellular telephone unit in response to the home mobile identification number and the serving switch system identification number; and modifying, at the cellular telephone unit, only the network planning area number of the home mobile identification number of the cellular telephone unit to identify the cellular telephone unit with the local cellular system number.

17. The method of claim 16, further comprising the steps of:

receiving the call for the cellular telephone unit at the central controller computer; and coupling the call to the cellular telephone unit through the serving switch using the local cellular system number.

18. The method of claim 17, wherein the step of coupling the call comprises:

accessing a roamer access port of the serving switch;

paging the cellular telephone unit using the local cellular system number; and patching a call to the cellular telephone unit through the serving switch.

19. The method of claim 17, wherein the step of receiving the call for the cellular telephone unit comprises:

establishing communication with the central controller computer; and providing an access number identifying the cellular telephone unit.

20. The method of claim 16, comprising the step of updating the location of the cellular telephone unit at the central controller computer in response to the roamer code.

21. The method of claim 16, wherein the home mobile identification number comprises:

a variable network planning area number; and a fixed number identifying the cellular telephone unit.

* * * * *